US012109670B1

(12) United States Patent
Wright et al.

(10) Patent No.: US 12,109,670 B1
(45) Date of Patent: Oct. 8, 2024

(54) TOOL FOR REMOVING A THREADED INSERT FROM A SUPPORTING STRUCTURE, AND RELATED METHOD OF USE

(71) Applicant: Gulfstream Aerospace Corporation, Savannah, GA (US)

(72) Inventors: Caleb Wright, Savannah, GA (US); Randy Thurman, Savannah, GA (US); Brian Kaluza, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 0 days.

(21) Appl. No.: 18/339,080

(22) Filed: Jun. 21, 2023

(51) Int. Cl.

| | |
|---|---|
| ***B25B 27/14*** | (2006.01) |
| ***B25B 27/00*** | (2006.01) |
| ***B25B 27/18*** | (2006.01) |
| *B25B 5/00* | (2006.01) |
| *B25B 5/06* | (2006.01) |
| *B25B 5/08* | (2006.01) |
| *B25B 5/10* | (2006.01) |
| *B25B 5/12* | (2006.01) |

(52) U.S. Cl.
CPC ........ *B25B 27/143* (2013.01); *B25B 27/0028* (2013.01); *B25B 27/14* (2013.01); *B25B 27/18* (2013.01); *B25B 27/0042* (2013.01)

(58) Field of Classification Search
CPC ..... B25B 27/14; B25B 27/0028; B25B 27/18; B25B 27/0042; B25B 5/00; B25B 5/067; B25B 5/082; B25B 5/125; B25B 5/101
See application file for complete search history.

(56) References Cited

U.S. PATENT DOCUMENTS

| | | | | |
|---|---|---|---|---|
| 5,031,487 A * | 7/1991 | Polonsky | B25B 27/18 | 81/53.2 |
| 5,148,590 A * | 9/1992 | Wu | B25B 27/22 | 29/257 |
| 5,586,378 A * | 12/1996 | Smith | B25B 27/023 | 81/177.8 |
| 5,713,117 A * | 2/1998 | Bliss | B25B 27/062 | 29/257 |
| 7,568,267 B2 * | 8/2009 | Lehner | B23P 6/00 | 29/798 |
| 9,751,199 B2 * | 9/2017 | Andrews | B25B 27/04 | |
| 2006/0200957 A1 * | 9/2006 | Lehner | E05D 11/00 | 29/11 |

* cited by examiner

*Primary Examiner* — Bayan Salone
(74) *Attorney, Agent, or Firm* — Lorenz & Kopf, LLP

(57) ABSTRACT

A method of removing a threaded insert from a wall structure is disclosed, where the insert has a flange and an internally threaded barrel. The disclosed method involves: introducing a bracket onto an outer edge of the wall structure, the bracket having a supporting arm with a hole, and the bracket having a plunger positioning arm with a threaded hole. The bracket is positioned such that the supporting arm is located on a first side of the wall structure, the plunger positioning arm is located on a second side of the wall structure, and the flange resides in the hole. A threaded plunger component is actuated to move a distal end section of the plunger component toward an exposed end of the threaded insert. Continued actuation of the plunger component increases force imparted on the exposed end of the threaded insert, until the insert is released from the wall structure.

19 Claims, 10 Drawing Sheets

TOOL FOR REMOVING A THREADED INSERT FROM A SUPPORTING STRUCTURE, AND RELATED METHOD OF USE

TECHNICAL FIELD

Embodiments of the subject matter described herein relate generally to repair tools and maintenance procedures for vehicles, such as aircraft. More particularly, embodiments of the subject matter relate to a tool for removing threaded inserts from a supporting structure, and related methods that use the tool.

BACKGROUND

In various industries and applications, certain structural and/or operating components require inspection, preventive maintenance, routine removal and replacement, and/or service maintenance. For example, a vehicle such as an aircraft may have certain components, devices, fasteners, or parts that are periodically removed for inspection or replacement. In this regard, an aircraft may include a number of removable panels, walls, or shrouds that are held in place with threaded inserts and fasteners. Over time, the threaded inserts and/or the fasteners may need to be maintained or replaced.

Accordingly, it is desirable to have a tool that is designed to quickly and easily remove an insert from a supporting structure, with little to no damage to the supporting structure and little to no structural degradation. In addition, it is desirable to have a related procedure for removing an insert from a supporting structure, which is appropriate for various vehicle and aircraft applications. Furthermore, other desirable features and characteristics will become apparent from the subsequent detailed description and the appended claims, taken in conjunction with the accompanying drawings and the foregoing technical field and background.

BRIEF SUMMARY

A tool for removing a threaded insert from a supporting wall structure is shown and described here. The threaded insert has a flange and an internally threaded barrel extending from the flange. Embodiments of the tool include a bracket and a plunger component that cooperates with the bracket. The bracket includes: a structure supporting arm having a hole formed therein, the hole shaped and sized to receive the flange of the threaded insert, and to accommodate translation of the threaded insert through the structure supporting arm; a plunger positioning arm having a threaded hole formed therein; a connecting section coupling the structure supporting arm to the plunger positioning arm, wherein at least a portion of the structure supporting arm opposes at least a portion of the plunger positioning arm; and a gap defined between the structure supporting arm and the plunger positioning arm, the gap shaped, sized, and configured to receive the supporting wall structure. The plunger component includes: a threaded body configured to engage the threaded hole of the plunger positioning arm; a pedestal extending from a distal end of the threaded body, the pedestal having a distal end defining a bearing surface that contacts an exposed end of the threaded insert during use; and a guide tip extending from the distal end of the pedestal, the guide tip shaped and sized to fit within the internally threaded barrel of the threaded insert during use. Insertion of the plunger component into the bracket moves the bearing surface of the pedestal against the exposed end of the threaded insert, and continued insertion of the plunger component into the bracket increases force imparted on the exposed end of the threaded insert. Further insertion of the plunger component into the bracket releases the threaded insert from the supporting wall structure to allow movement of the flange of the threaded insert within the hole of the structure supporting arm.

Also described here is a method of removing a threaded insert from a supporting wall structure having an exposed outer edge, where the threaded insert has a flange and an internally threaded barrel extending from the flange. Embodiments of the method involve: introducing a bracket onto the exposed outer edge of the supporting wall structure, wherein the bracket includes a structure supporting arm having a hole formed therein, and the bracket includes a plunger positioning arm having a threaded hole formed therein. The bracket is positioned such that the structure supporting arm is located on a first side of the supporting wall structure, the plunger positioning arm is located on a second side of the supporting wall structure, and the flange resides in the hole. The method continues by actuating a plunger component threaded into the threaded hole of the plunger positioning arm, to move a distal end section of the plunger component toward an exposed end of the threaded insert. The plunger component is further actuated to increase force imparted on the exposed end of the threaded insert, until the threaded insert is released from the supporting wall structure. Further actuation of the plunger component moves the threaded insert within the hole of the structure supporting arm.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
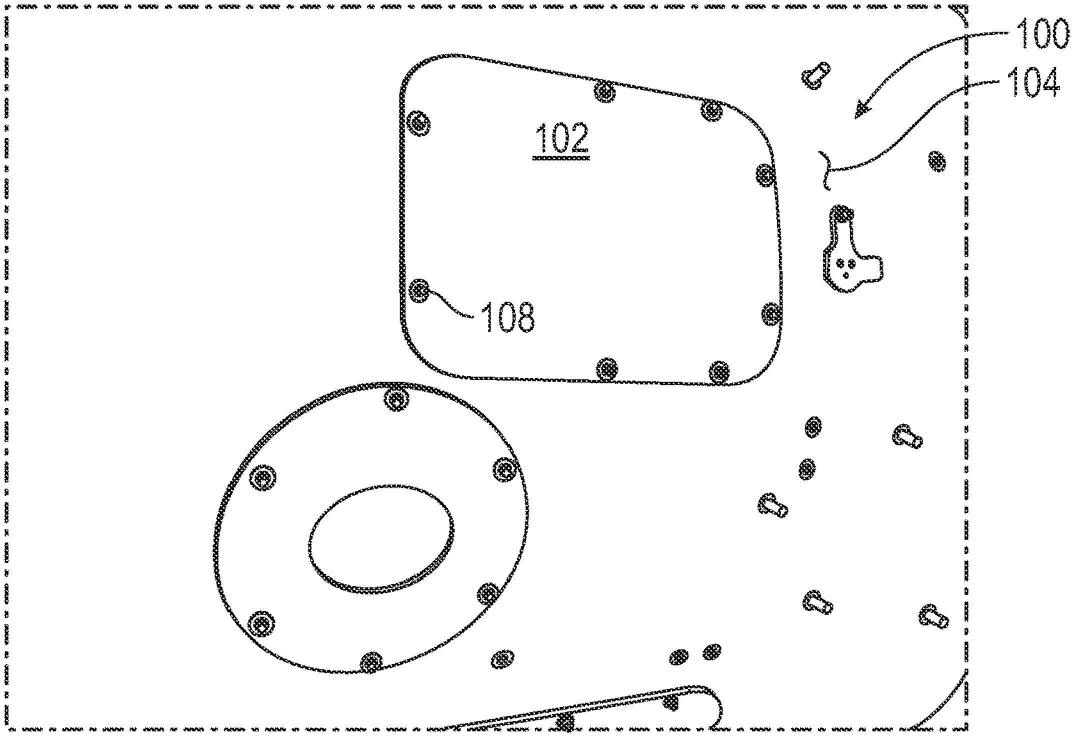
FIG. 1 is an exterior view of an aircraft component having a removable panel attached thereto.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

Various embodiments contemplated herein relate to a tool for removing an insert (e.g., a threaded insert) from a supporting wall structure of the type found in a vehicle such as an aircraft. This disclosure also relates to a related method of removing an insert, which uses the disclosed removal tool. In accordance with the disclosed embodiment, the tool includes a generally C-shaped bracket and an adjustable plunger component that is threaded into the bracket. The bracket includes two arms that allow the bracket to be positioned on an edge of the supporting wall structure with the two arms extending above and below the outer surfaces of the supporting wall structure. One arm includes a hole that receives a flange of the insert that is to be removed. The other arm includes a threaded hole that receives the plunger component. The plunger component is actuated (rotated) to advance its distal end toward an exposed end of the insert. Continued rotation of the plunger component imparts increasing force on the insert, until the insert is released from the supporting wall structure. The body of the arm surrounding the flange of the insert supports the underlying area of the supporting wall structure during use, which protects the underlying wall structure from damage associated with the insert removal procedure.

Figure 2:
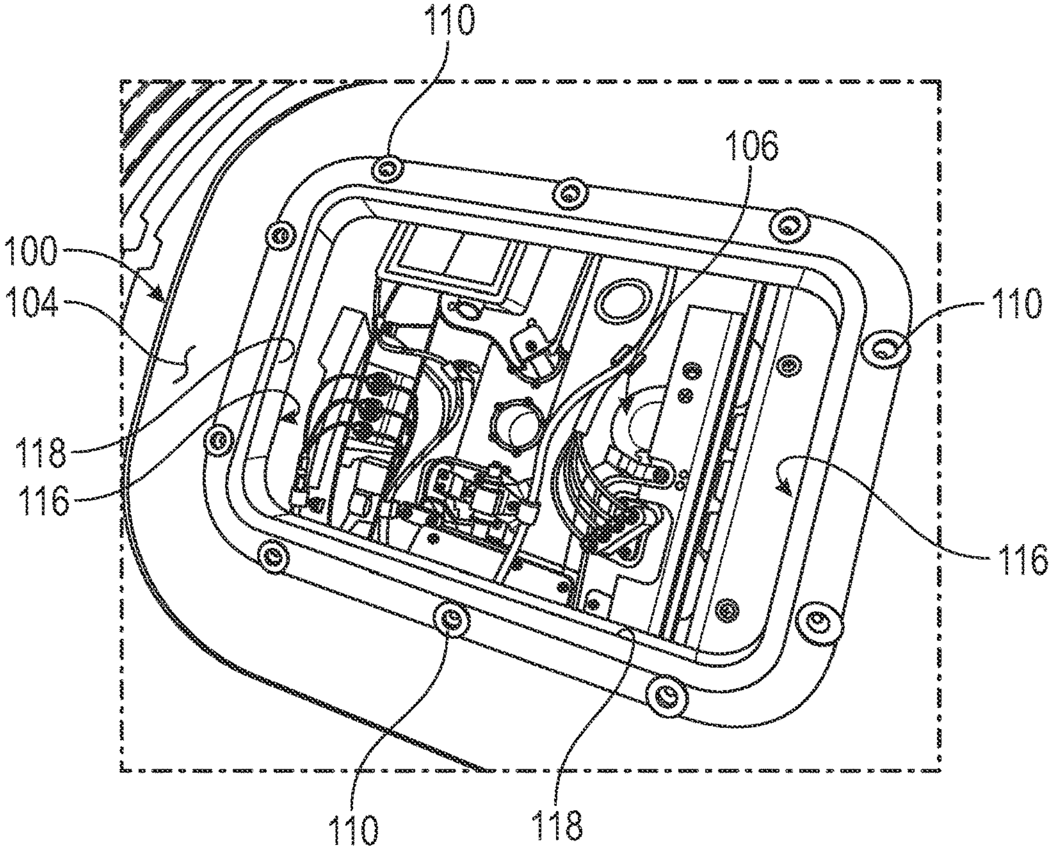
FIG. 2 is an exterior view of the aircraft component without the removable panel.

Referring to the drawings, FIG. 1 is an exterior view of an aircraft component 100 having a removable panel 102 attached thereto, and FIG. 2 is an exterior view of the aircraft component 100 without the removable panel 102. For this particular non-limiting example, the aircraft component 100 is a jet engine bypass duct, and the removable panel 102 is removably attached to a supporting wall structure 104 of the bypass duct. The removable panel 102 forms a seal with the supporting wall structure 104 when properly installed, and provides access to the interior 106 of the bypass duct when it is removed. For this particular implementation, the removable panel 102 is secured to the aircraft component 100 using externally threaded fasteners 108 that are compatible with internally threaded inserts 109 affixed to the supporting wall structure 104 (the illustrated example uses ten fasteners 108 for ten corresponding threaded inserts 109). Each threaded insert 109 cooperates with an outer collar 110, wherein a flange of the outer collar 110 is coupled to the exterior side of the supporting wall structure 104 (see FIG. 2) and a flange 114 of the threaded insert 109 is coupled to the interior side of the supporting wall structure 104 (see FIG. 3).

As shown in FIG. 2, the supporting wall structure 104 has an access opening 116 defined therein. The access opening 116 terminates at an exposed outer edge 118 of the supporting wall structure 104. The exposed outer edge 118 corresponds to the thickness of the supporting wall structure 104. A portion of each threaded insert 109 (when installed) resides within the interior (wall thickness) of the supporting wall structure 104. Likewise, a portion of each outer collar 110 (when installed) resides within the interior of the supporting wall structure 104.

Figure 4:
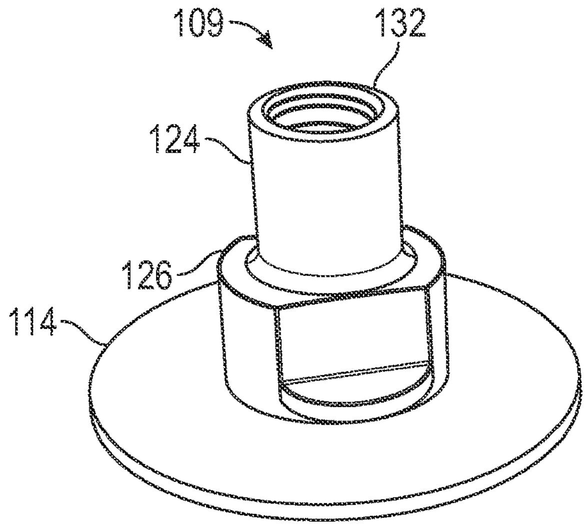
FIG. 4 is a perspective top view of an exemplary embodiment of a threaded insert that is suitable for use with an aircraft component.
Figure 5:
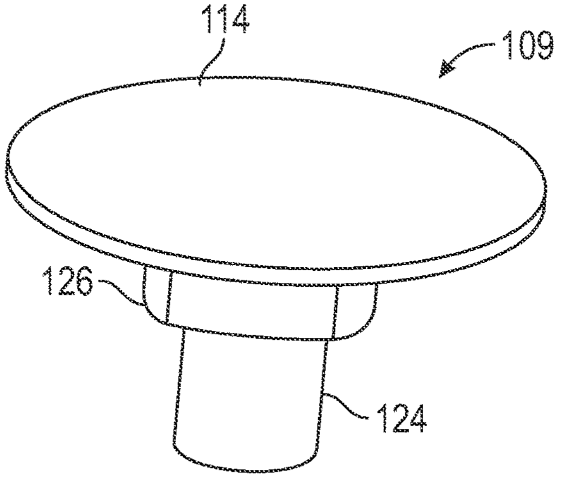
FIG. 5 is a perspective bottom view of the threaded insert.

FIG. 4 and FIG. 5 are perspective views of an exemplary embodiment of the threaded insert 109. As mentioned above, the threaded insert 109 includes a flange 114, which serves as a base of the threaded insert 109. Although not always required, the illustrated embodiment includes a circular shaped flange 114. The threaded insert 109 includes an internally threaded barrel 124 extending from the flange 114. The shape, size, and configuration of the barrel 124 can be chosen to suit the needs of the particular application; the illustrated embodiment utilizes a cylindrical barrel 124. The threaded insert 109 may also include a pedestal region 126 that provides additional structural support between the flange 114 and the threaded barrel 124. The internal threads of the threaded insert 109 are sized for compatibility with the externally threaded fasteners 108 used to secure the removable panel 102 to the supporting wall structure 104.

The threaded inserts 109 are secured to the supporting wall structure 104 by feeding the barrel 124 into a hole or passageway formed in the supporting wall structure 104. The flat surface of the flange 114 surrounding the pedestal region 126 is glued, bonded, welded, or otherwise affixed to the surface of the supporting wall structure 104 that immediately surrounds the hole or passageway. Consequently, the threaded insert 109 remains in place relative to the supporting wall structure 104, and does not rotate when the fastener 108 is tightened to hold the removable panel 102 against the supporting wall structure 104.

The tool described herein is used to gently remove the threaded inserts 109 in a non-destructive manner. The tool is used to break the bond between the threaded insert 109 and the supporting wall structure 104 in a way that preserves the structural integrity of the supporting wall structure 104 with little to no resulting physical trauma or damage. Consequently, a new threaded insert 109 can be quickly and easily installed to replace the one that was removed. Maintaining the physical integrity of the supporting wall structure 104 is particularly important when the supporting wall structure 104 is fabricated from material or one or more layers of material that might be susceptible to damage during removal of the threaded inserts 109. For example, the supporting wall structure 104 may be fabricated from, or include a layer of, composite material, rigid thermal insulation material, carbon fiber material, or the like.

FIGS. 6-12 are various views of an exemplary embodiment of the tool 200 and its constituent components, and FIGS. 13-20 are various views that demonstrate the manner in which the tool 200 is used to remove an insert from its supporting wall structure. The tool 200 includes two primary components: a bracket 202; and a plunger component 204 that is configured to cooperate with the bracket 202. For the illustrated embodiment, the plunger component 204 removably engages with the bracket 202 by way of a threaded arrangement (internal threads in the bracket 202, and matching external threads on the plunger component 204). Accordingly, rotation of the plunger component 204 relative to the bracket 202 causes the plunger component 204 to move up and down (when viewed from the perspective of FIG. 6 and FIG. 7).

Figure 6:
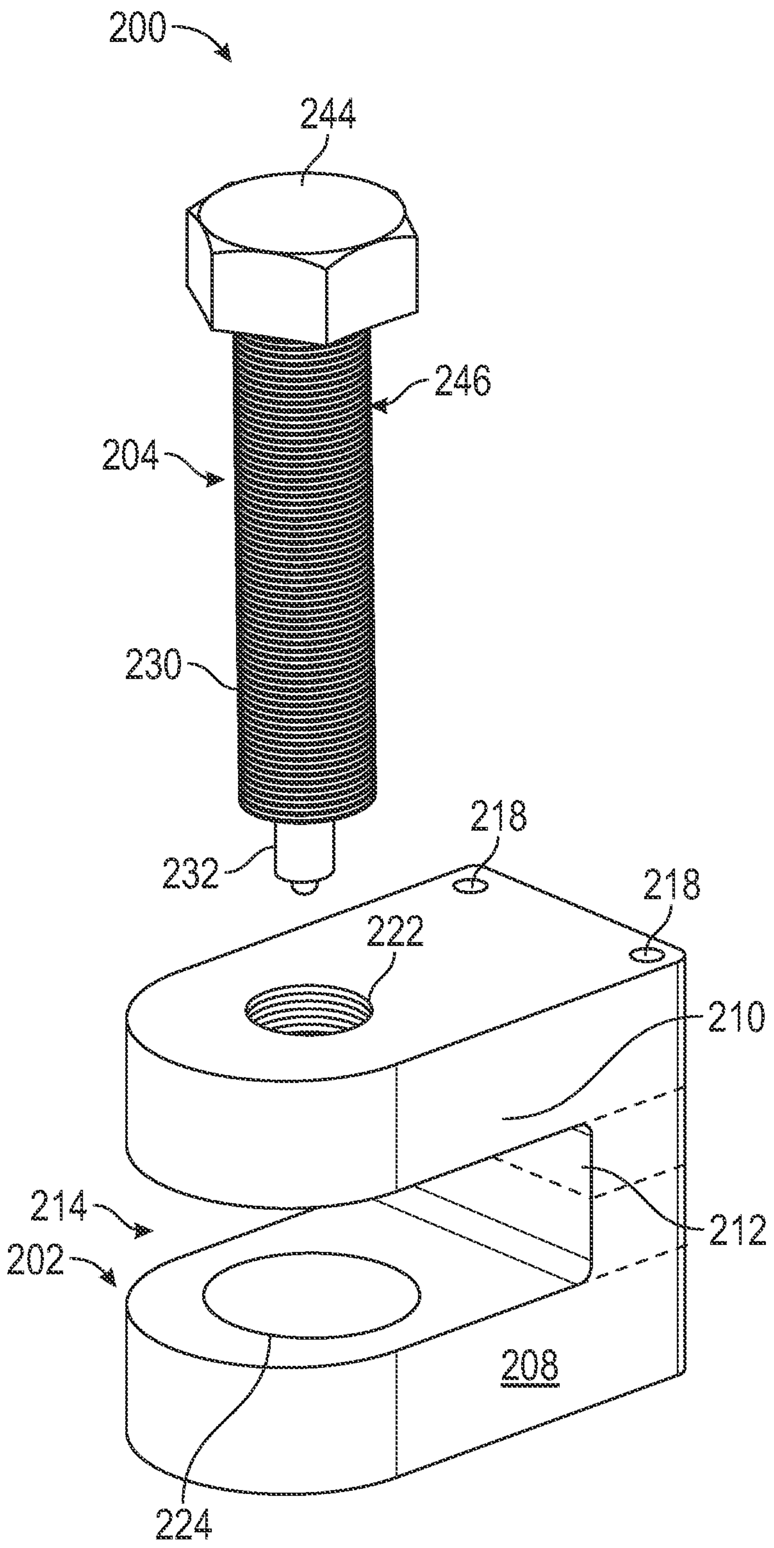
FIG. 6 is an exploded perspective view of an exemplary embodiment of a tool that is designed to remove a threaded insert of the type shown in FIG. 4 and FIG. 5.
Figure 7:
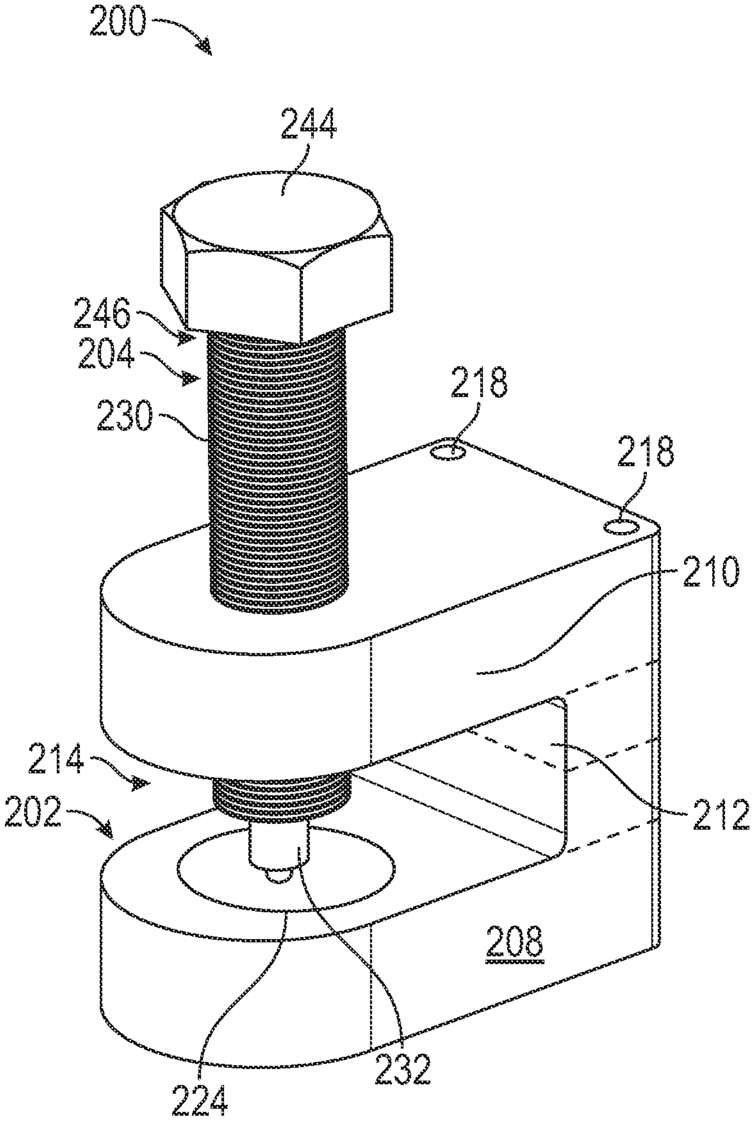
FIG. 7 is a perspective view of the tool, after assembly.
Figure 8:
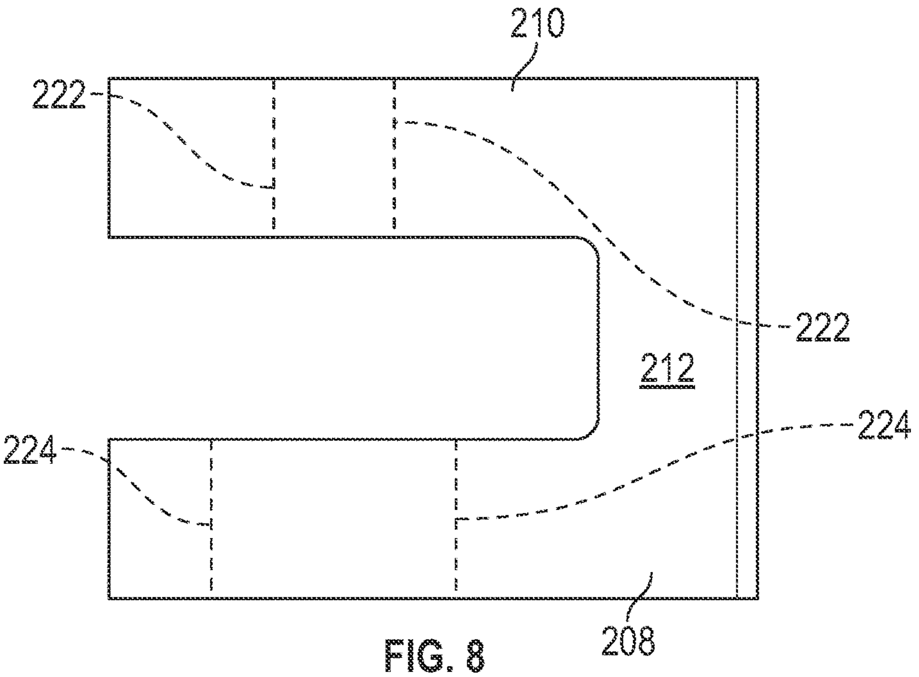
FIG. 8 is a side view of a bracket that forms part of the tool.
Figure 9:
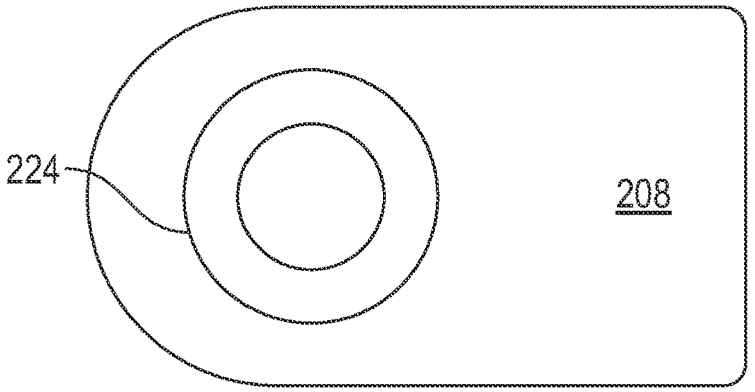
FIG. 9 is a bottom view of the bracket.
Figure 10:
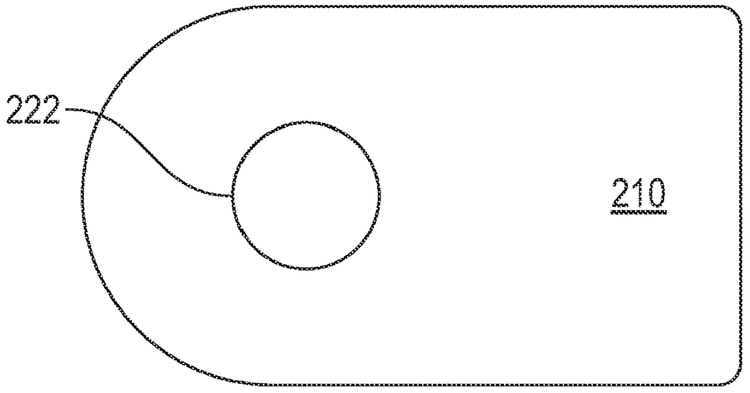
FIG. 10 is a top view of the bracket.
Figure 12:
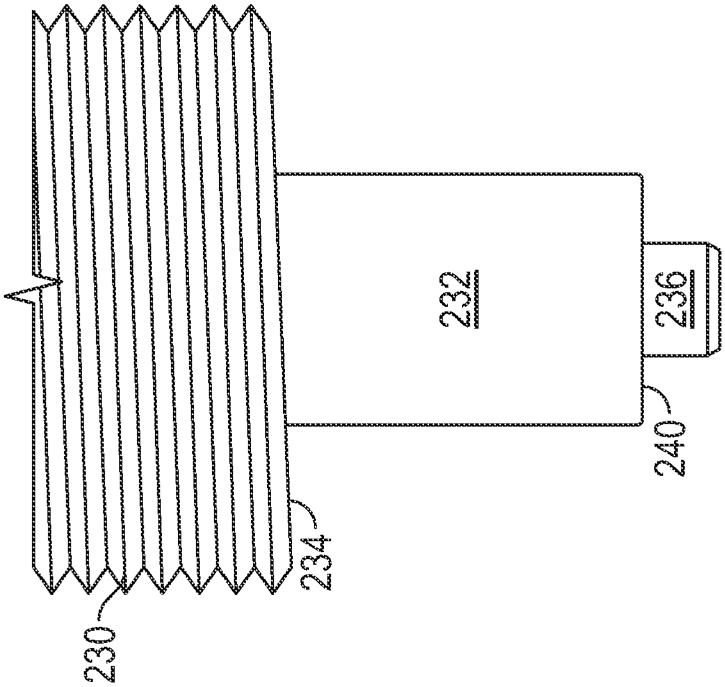
FIG. 12 is a side view of the distal end section of the plunger component.
Figure 11:
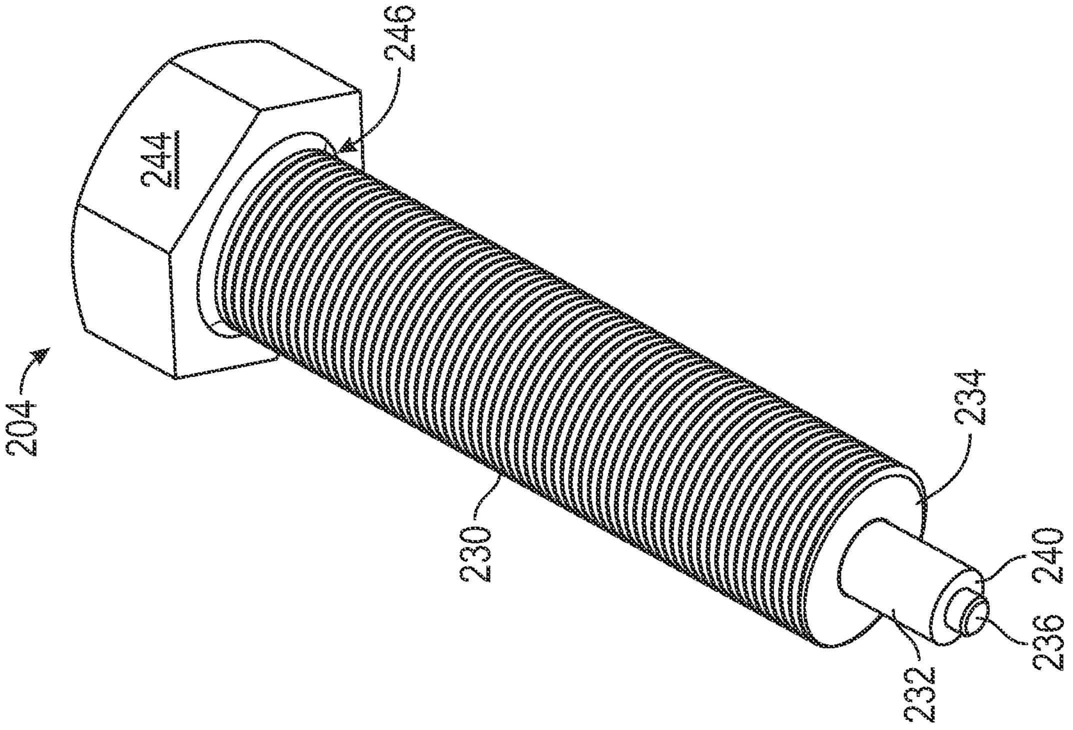
FIG. 11 is a perspective view of a plunger component that forms part of the tool.

The depicted embodiment of the bracket 202 includes, without limitation: a structure supporting arm 208; a plunger positioning arm 210; a connecting section 212; and a gap 214 defined between the structure supporting arm 208 and the plunger positioning arm 210. In accordance with certain embodiments, the structure supporting arm 208, the plunger positioning arm 210, and the connecting section 212 are integrally formed together. In this regard, the bracket 202 can be fabricated as a one-piece component using any suitable material or combination of materials (e.g., a machined or cast metal, fabricated by way of an additive manufacturing technique, a composite material, a plastic or nylon material, or the like). In accordance with other embodiments, the structure supporting arm 208 and/or the plunger positioning arm 210 are removable from the connecting section 212. In such embodiments, the connecting section 212 may be configured for compatibility with a plurality of differently shaped and sized structure supporting arms, and/or the connecting section 212 may be configured for compatibility with a plurality of differently shaped and sized plunger positioning arms. For example, the lengths of the arms can be changed to accommodate different installation locations of the threaded inserts 109 (which may be relatively close to the edge 118 of the supporting wall structure 104 or relatively far from the edge 118). As another example, it may be desirable to have a selectable hole size or shape (for the hole in the structure supporting arm) to accommodate differently shaped or sized inserts. The dashed lines in FIG. 6 and FIG. 7 schematically depict potential dividing lines between the arms, along with optional fasteners 218 that could be used to connect the arms together.

The connecting section 212 couples the structure supporting arm 208 to the plunger positioning arm 210, such that at least a portion of the structure supporting arm 208 opposes at least a portion of the plunger positioning arm 210. More specifically, an inward-facing surface of the structure supporting arm 208 opposes and faces an inward-facing surface of the plunger positioning arm 210. These opposing inward-facing surfaces define the height, H, of the gap 214 (see FIG. 8), which must be tall enough to accommodate the thickness of the supporting wall structure 104. In this regard, the gap 214 is suitably shaped, sized, and configured to receive the supporting wall structure 104 during use of the tool 200 (see FIG. 14 and FIG. 15).

The plunger positioning arm 210 includes an internally threaded hole 222 formed therein, and the structure supporting arm 208 includes a hole 224 formed therein. The threaded hole 222 is configured in accordance with the dimensions and thread specifications of the plunger component 204. The hole 224 is shaped and sized to receive the flange 114 of the threaded insert 109, and is shaped and sized to accommodate translation of the threaded insert 109 through the structure supporting arm 208 as needed. Although not always required, the hole 224 is preferably circular in shape to accommodate the circular shape of the flange 114. In accordance with certain embodiments, the flange 114 has a circular perimeter with a flange diameter, the hole 224 has a circular perimeter with a hole diameter, the hole diameter is greater than the flange diameter, and the difference between the hole diameter and the flange diameter is about 0.015 to about 0.0040 inches. In certain embodiments, the difference between the hole diameter and the flange diameter is less than or equal to 0.0040 inches. This tight tolerance is desirable to accommodate an accurate placement of the flange 114 within the hole 224 while providing adequate physical support to the section of the supporting wall structure 104 that is immediately adjacent to the flange 114.

The illustrated embodiment of the plunger component 204 includes, without limitation: a threaded body 230 that is configured to engage the threaded hole 222 of the plunger positioning arm 210; a pedestal 232 extending from a distal end 234 of the threaded body 230; and a guide tip 236 extending from a distal end 240 of the pedestal 232. The distal end 240 of the pedestal 232 defines a bearing surface that contacts an exposed end of the threaded insert 109 during use. The guide tip 236 is shaped, sized, and configured to fit within the internally threaded barrel 124 of the threaded insert 109 during use. The plunger component 204 also includes a head 244 coupled to or integrated with a proximal end 246 of the threaded body 230. The head 244 includes at least one structural feature that is compatible with a torque-applying tool, device, or system. In this regard, the illustrated embodiment of the plunger component 204 can be fabricated from a threaded bolt having the pedestal 232, the guide tip 236, and the head 244 integrally formed therein. For example, the end of a threaded bolt can be machined or otherwise processed to define the pedestal 232, the guide tip 236, and the bearing surface. Moreover, the head 244 may be a standard hex shaped bolt head that is compatible with a torque-applying tool such as a socket, a wrench, or the like. Alternatively or additionally, the head 244 may include one or more structural features that are compatible with a screwdriver, an Allen wrench tool, or the like.

In certain embodiments, the hole 224 in the structure supporting arm 208 and the threaded hole 222 in the plunger positioning arm 210 are concentric and aligned with the central longitudinal axis of the plunger component 204 when the plunger component 204 is engaged with the bracket 202. Moreover, the pedestal 232 and the guide tip 236 are concentric and aligned with the central longitudinal axis of the plunger component 204. This concentrically aligned arrangement is shown in FIGS. 7 and 17-20.

Figure 14:
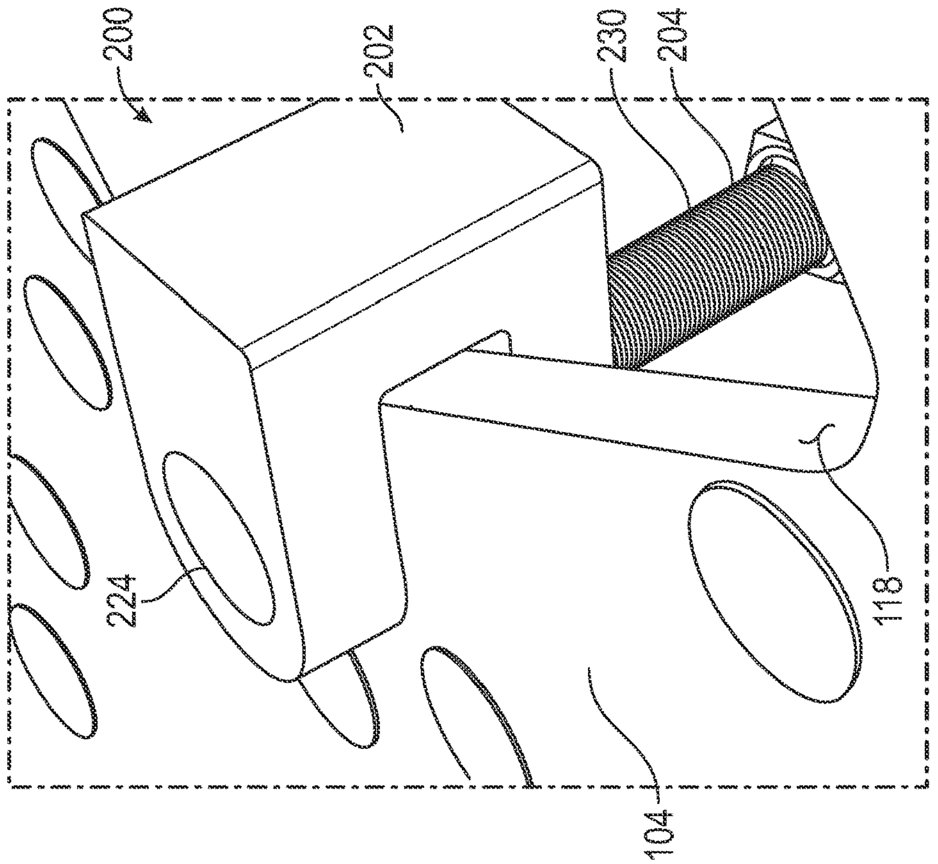
FIGS. 13 and 14 are interior views of an aircraft component, depicting engagement of the tool with a threaded insert that is installed in a supporting wall structure.
Figure 15:
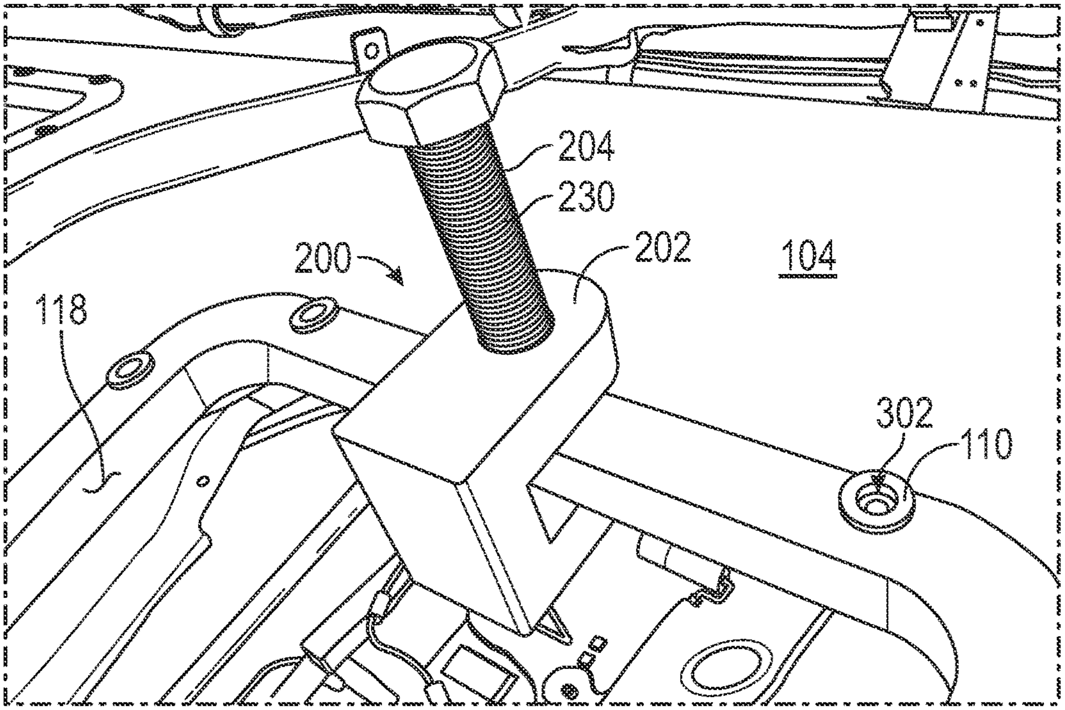
FIG. 15 is an exterior view of an aircraft component, depicting engagement of the tool with a threaded insert that is installed in a supporting wall structure.
Figure 16:
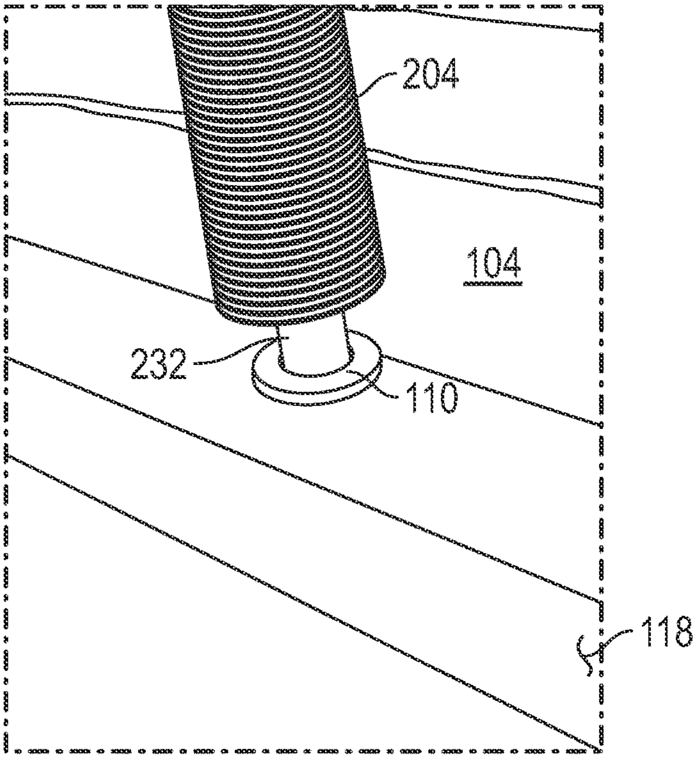
FIG. 16 is an exterior view of an aircraft component, depicting engagement of the distal end section of the plunger component with a threaded insert.
Figure 17:
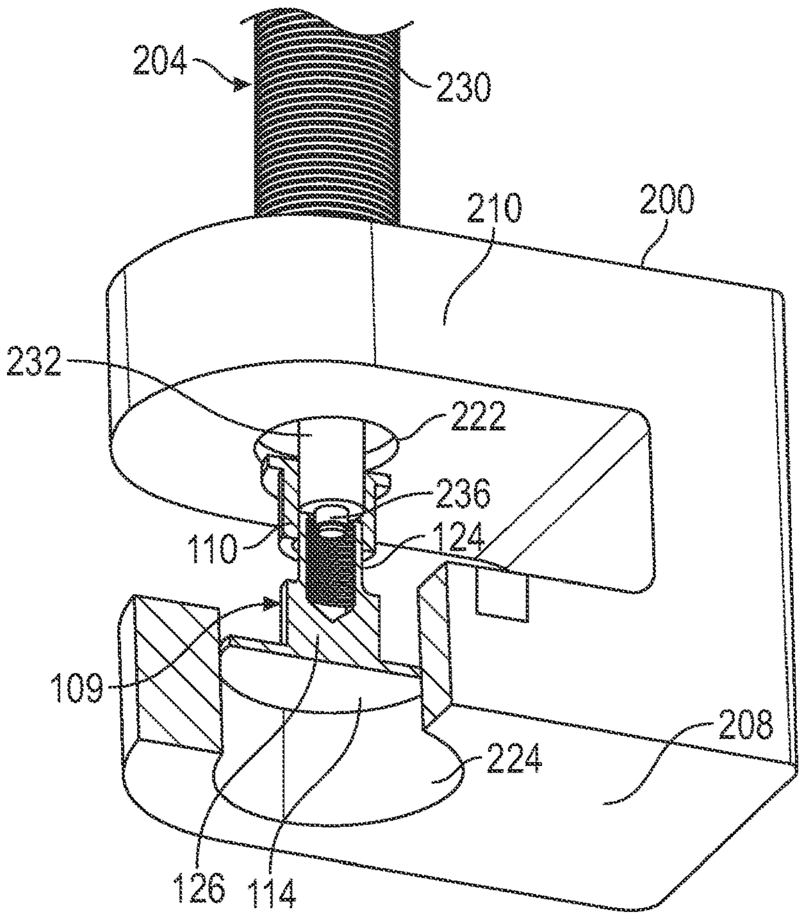
FIG. 17 is a partially cutaway perspective view of the tool, depicting engagement of the distal end section of the plunger component with a threaded insert and an outer collar.
Figure 18:
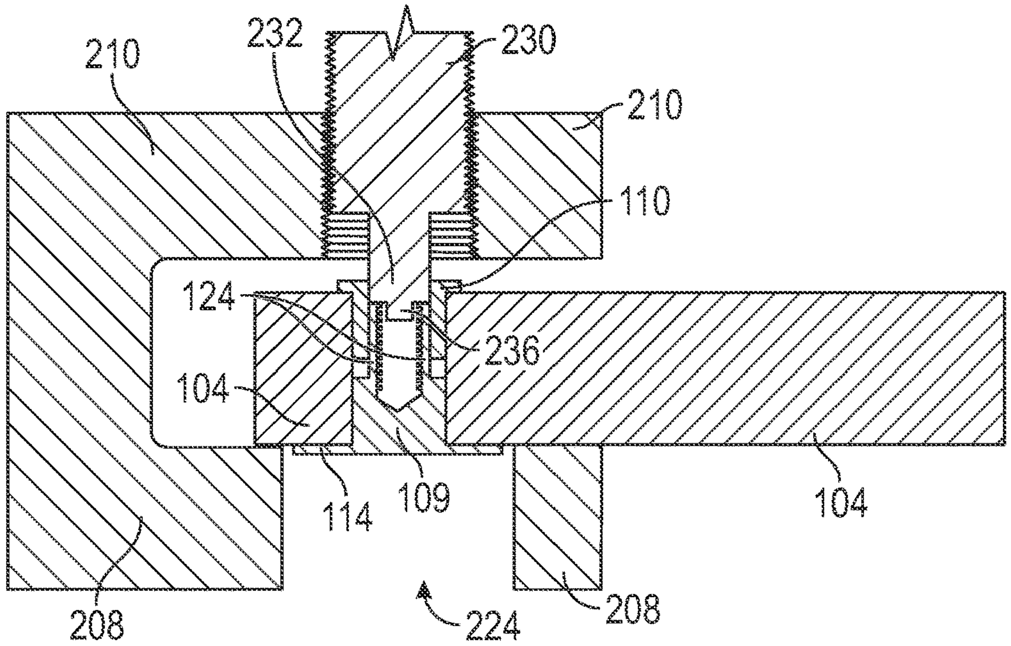
FIG. 18 is a cross-sectional side view of the tool, depicting a state of initial engagement of the distal end section of the plunger component with the threaded insert.
Figure 19:
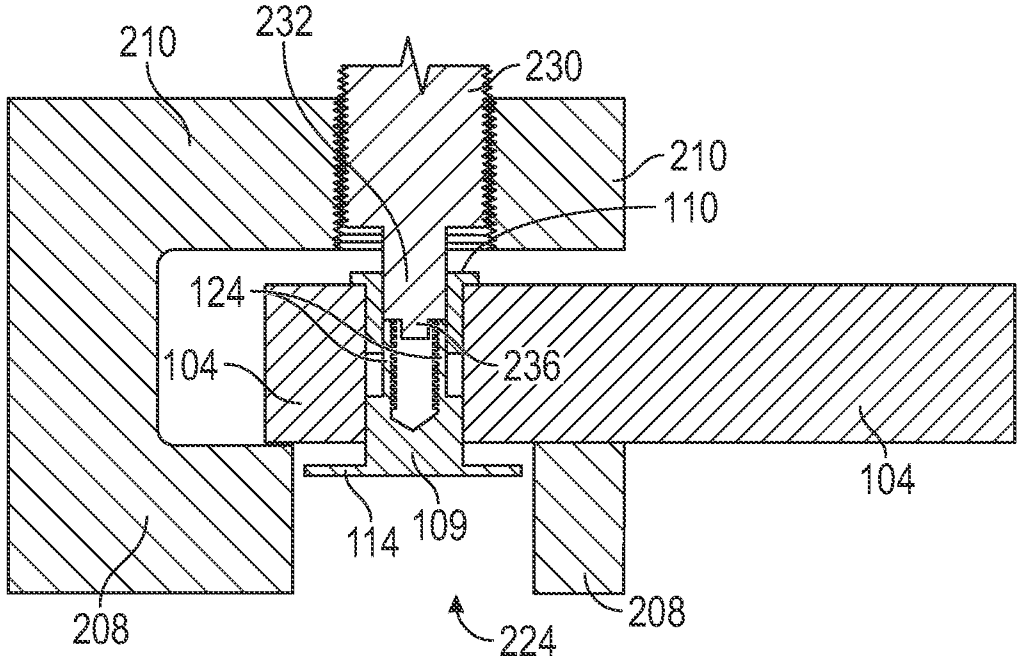
FIG. 19 is a cross-sectional side view of the tool, depicting a state after the threaded insert has been moved downward due to force imparted by the plunger component.
Figure 20:
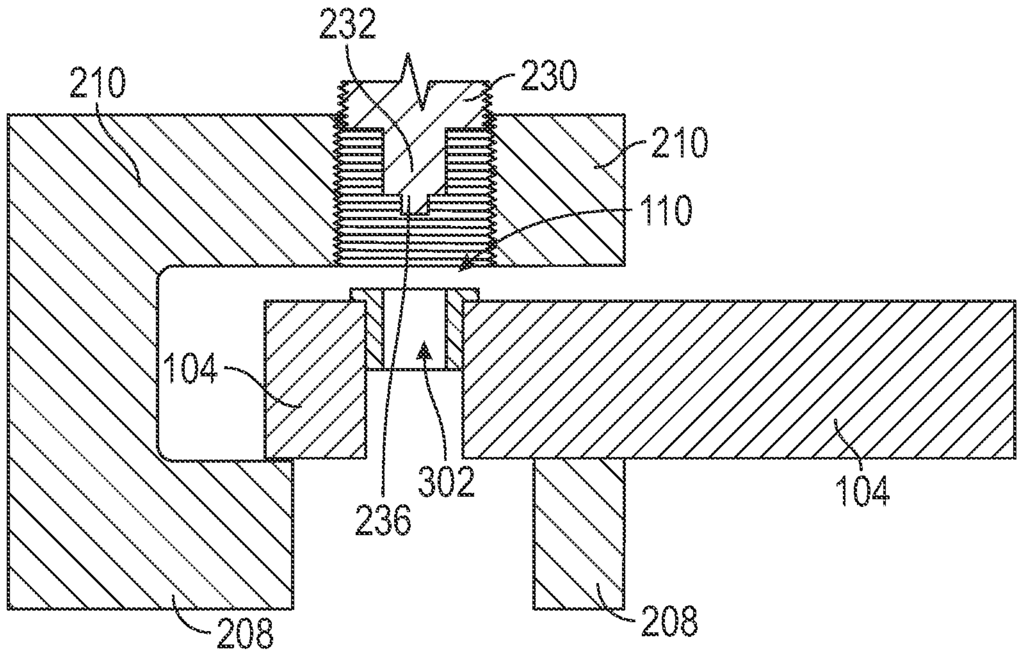
FIG. 20 is a cross-sectional side view of the tool, depicting a state after removal of the threaded insert.

A method of removing a threaded insert from a supporting wall structure will now be described with reference to FIGS. 13-20, and with continued reference to FIGS. 1-12 as needed. The following example assumes that a threaded insert 109 cooperates with an outer collar 110 installed in the supporting wall structure 104 (as described above). The outer collar 110 may be coupled to the supporting wall structure 104 by way of an adhesive, glue, welding, bonding, press-fitting, or the like. The outer collar 110 has a collar hole 302 defined therein, as best depicted in FIGS. 15 and 20. The collar hole 302 receives and mates with the internally threaded barrel 124 of the threaded insert 109 when they are installed in the supporting wall structure 104. More specifically, the outer surface of the barrel 124 is seated with the collar hole 302, as best depicted in FIG. 18. The pedestal 232 of the plunger component 204 is shaped, sized, and configured to fit within the collar hole 302 during use (see FIGS. 16-19).

Figure 3:
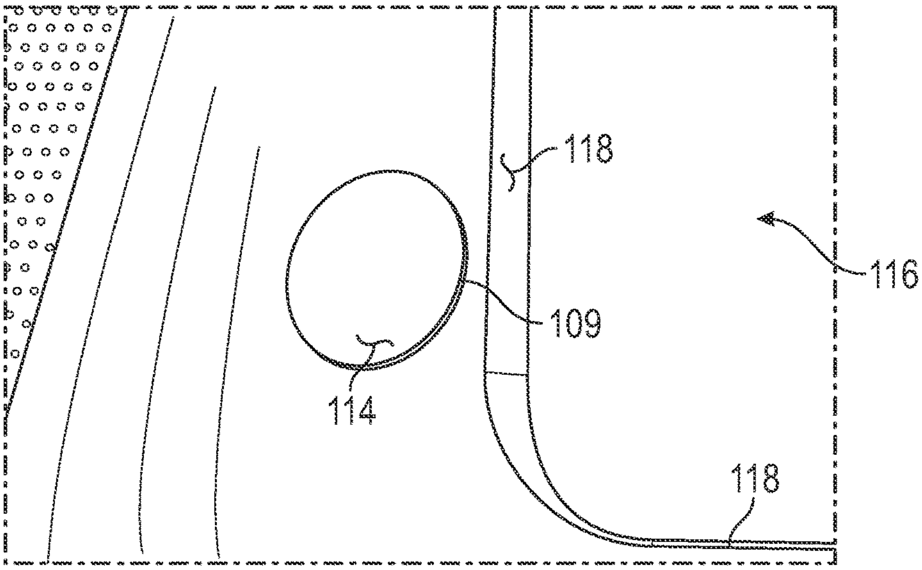
FIG. 3 is an interior view of a portion of the aircraft component.
Figure 13:
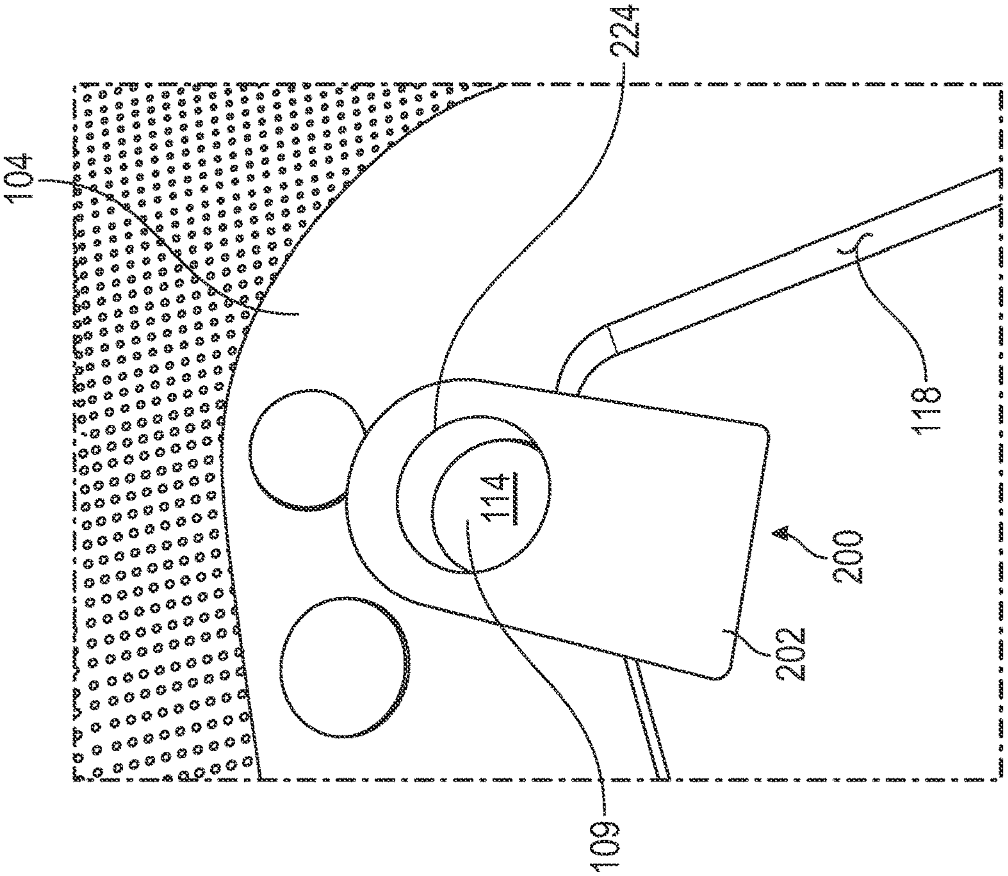

The exemplary procedure described here begins by introducing the bracket 202 onto the exposed outer edge 118 of the supporting wall structure 104, and by positioning the bracket 202 such that: the structure supporting arm 208 is located on a first side (e.g., the interior side) of the supporting wall structure 104; the plunger positioning arm 210 is located on a second side (e.g., the exterior side) of the supporting wall structure 104; and the flange 114 of the threaded insert 109 resides in the hole 224 of the plunger positioning arm 210. FIG. 3 shows the interior side of the supporting wall structure 104 and an installed threaded insert 109 before placement of the bracket 202; FIGS. 13 and 14 show the interior side of the wall structure 104 after placement of the bracket 202; and FIG. 15 shows the exterior side of the wall structure 104 after placement of the bracket 202. The thickness of the flange 114 and the close tolerance of the hole 224 surrounding the flange 114 makes it easy to detect proper alignment and positioning of the bracket 202 as it engages the flange 114. The bracket 202 can be manually placed on the supporting wall structure 104 without the plunger component 204, or it can be positioned with the plunger component 204 initially threaded into the threaded hole 222 by a small amount (such that the distal end section of the plunger component 204 does not interfere with the supporting wall structure 104).

This description assumes that the plunger component 204 is already engaged with the plunger positioning arm 210 of the bracket 202, as depicted in FIGS. 14 and 15. Next, the plunger component 204 is actuated to move its distal end section (including the pedestal 232 and the guide tip 236) toward the exposed end 132 of the threaded insert 109. The exposed end 132 is labeled in FIG. 4. For this particular implementation, actuation of the plunger component 204 involves the rotation of the plunger component 204 relative to the bracket 202. For example, the head 244 of the plunger component 204 can be rotated using an open ended wrench, a socket tool, or the like, which inserts the plunger component 204 into the bracket 202. Continued actuation/insertion of the plunger component 204 in this manner advances the pedestal 232 within the collar hole 302, and eventually moves the bearing surface of the pedestal 232 against the exposed end 132 of the threaded insert 109. Actuating the plunger component 204 in this manner also moves the guide tip 236 into the internally threaded barrel 124 of the threaded insert 109. FIG. 18 depicts a state of initial engagement of the bearing surface of the pedestal 232 with the end of the threaded insert 109, wherein the guide tip 236 is seated within the internally threaded barrel 124.

After the bearing surface of the pedestal 232 makes contact with the end of the threaded insert 109, the plunger component 204 can be further actuated (e.g., rotated), resulting in continued insertion of the plunger component 204 into the bracket. Continued insertion of the plunger component 204 increases the amount of force imparted on the exposed end of the threaded insert 109, which initially remains fixed in its original position in the supporting wall structure 104. The plunger component 204 is further actuated in this manner to continue increasing the amount of force imparted by the bearing surface of the pedestal 232 until the amount of force is sufficient to release the threaded insert 109 from the supporting wall structure 104. In this regard, the plunger component 204 is rotated until it breaks the bond between the threaded insert 109 and the supporting wall structure 104, and the bond (if any) between the threaded insert 109 and the outer collar 110. Notably, the surface of the structure supporting arm 208 (which is in contact with the supporting wall structure 104) provides support immediately surrounding the periphery of the flange 114, such that the flange 114 can be effectively and accurately released with little to no resulting structural damage to the supporting wall structure 104. Releasing the threaded insert 109 in this manner allows movement of the flange 114 within the hole 224 of the structure supporting arm 208. FIG. 19 depicts a state after the threaded insert 109 has been released and moved downward due to the force imparted by the plunger component 204. As depicted in FIG. 19, the flange 114 has separated from the supporting wall structure 104, and has traveled downward within the hole 224.

After the threaded insert 109 is free from the supporting wall structure 104, continued insertion of the plunger component 204 into the bracket 202 moves the threaded insert 109 even further within the hole 224, and eventually decouples the threaded insert 109 from the outer collar 110 (the outer collar 110 can remain in the same position shown in FIG. 19). The threaded insert 109 can be removed from the supporting wall structure 104 at an appropriate time after it has been released. In some situations, the threaded insert 109 may simply fall out of place. In other situations, the flange 114 may be exposed outside of the structure supporting arm 208, such that the user can remove the threaded insert 109 by holding the flange 114 (manually or with a suitable tool). In other situations, the threaded insert 109 can be removed (manually or with a suitable tool) after removing the plunger component 204 from the bracket 202, whether or not the bracket 202 remains in place overlying the supporting wall structure 104.

For the non-limiting example presented here, the plunger component 204 is advanced until the threaded insert 109 is decoupled from the supporting wall structure 104, and has traveled sufficiently far to accommodate removal. Thereafter, the methodology involves retracting the plunger component 204 to facilitate removal of the threaded insert 109 (if it hasn't already been removed) and to facilitate removal of the bracket 202 from the supporting wall structure 104. The following description assumes that the threaded insert 109 remains in place after it has been released from the supporting wall structure 104. Accordingly, retracting (e.g., by rotation in the appropriate direction) the plunger component 204 separates the bearing surface of the pedestal 232 from the end of the internally threaded barrel 124 and eventually withdraws the pedestal from the collar hole 302 of the outer collar 110 (see FIG. 20). In certain situations, the outer collar 110 remains in place within the supporting wall structure 104 after the plunger component 204 has been retracted, as depicted in FIG. 20. Next, the bracket 202 can be removed from the supporting wall structure 104 to make it easier to remove the threaded insert 109 and install a new threaded insert in its place.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A tool for removing a threaded insert from a supporting wall structure, the threaded insert having a flange and an internally threaded barrel extending from the flange, the tool comprising:

a bracket comprising:

a structure supporting arm having a hole formed therein, the hole shaped and sized to receive the flange of the threaded insert, and to accommodate translation of the threaded insert through the structure supporting arm;

a plunger positioning arm having a threaded hole formed therein;

a connecting section coupling the structure supporting arm to the plunger positioning arm, wherein at least a portion of the structure supporting arm opposes at least a portion of the plunger positioning arm; and a gap defined between the structure supporting arm and the plunger positioning arm, the gap shaped, sized, and configured to receive the supporting wall structure; and a plunger component configured to cooperate with the bracket, the plunger component comprising:

a threaded body configured to engage the threaded hole of the plunger positioning arm;

a pedestal extending from a distal end of the threaded body, the pedestal having a distal end defining a bearing surface that contacts an exposed end of the threaded insert during use; and a guide tip extending from the distal end of the pedestal, the guide tip shaped and sized to fit within the internally threaded barrel of the threaded insert during use;

wherein insertion of the plunger component into the bracket moves the bearing surface of the pedestal against the exposed end of the threaded insert, continued insertion of the plunger component into the bracket increases force imparted on the exposed end of the threaded insert, and further insertion of the plunger component into the bracket releases the threaded insert from the supporting wall structure to allow movement of the flange of the threaded insert within the hole of the structure supporting arm.

2. The tool recited in claim 1, wherein:

the flange of the threaded insert has a circular perimeter with a flange diameter;

the hole of the structure supporting arm has a circular perimeter with a hole diameter;

the hole diameter is greater than the flange diameter; and the difference between the hole diameter and the flange diameter is less than or equal to 0.0040 inches.

3. The tool recited in claim 1, wherein the structure supporting arm, the plunger positioning arm, and the connecting section are integrally formed together.

4. The tool recited in claim 1, wherein:

the structure supporting arm and the plunger positioning arm are removable from the connecting section;

the connecting section is configured for compatibility with a plurality of differently shaped and sized structure supporting arms; and the connecting section is configured for compatibility with a plurality of differently shaped and sized plunger positioning arms.

5. The tool recited in claim 1, wherein:

the plunger component comprises a head coupled to or integrated with a proximal end of the threaded body; and the head comprises at least one structural feature that is compatible with a torque-applying tool, device, or system.

6. The tool recited in claim 1, wherein the hole of the structure supporting arm and the threaded hole of the plunger positioning arm are concentric and aligned with a longitudinal axis of the plunger component when the plunger component is engaged with the bracket.

7. The tool recited in claim 6, wherein the pedestal and the guide tip are concentric and aligned with the longitudinal axis of the plunger component.

8. The tool recited in claim 1, wherein the plunger component is fabricated from a threaded bolt having the pedestal and the guide tip integrally formed therein.

9. The tool recited in claim 1, wherein:

the threaded insert cooperates with an outer collar installed in the supporting wall structure, the outer collar having a collar hole defined therein;

the collar hole receives and mates with the internally threaded barrel of the threaded insert when installed in the supporting wall structure; and the pedestal of the plunger component is shaped and sized to fit within the collar hole during use.

10. The tool recited in claim 9, wherein:

the further insertion of the plunger component into the bracket releases the threaded insert from the supporting wall structure and decouples the threaded insert from the outer collar.

11. The tool recited in claim 10, wherein:

retraction of the plunger component withdraws the pedestal from the collar hole, while leaving the outer collar in place within the supporting wall structure.

12. A method of removing a threaded insert from a supporting wall structure having an exposed outer edge, the threaded insert having a flange and an internally threaded barrel extending from the flange, the method comprising:

introducing a bracket onto the exposed outer edge of the supporting wall structure, the bracket comprising a structure supporting arm having a hole formed therein, and the bracket comprising a plunger positioning arm having a threaded hole formed therein, wherein the bracket is positioned such that the structure supporting arm is located on a first side of the supporting wall structure, the plunger positioning arm is located on a second side of the supporting wall structure, and the flange resides in the hole;

actuating a plunger component threaded into the threaded hole of the plunger positioning arm, to move a distal end section of the plunger component toward an exposed end of the threaded insert; and continuing actuation of the plunger component to increase force imparted on the exposed end of the threaded insert, until the threaded insert is released from the supporting wall structure, wherein further actuation of the plunger component moves the threaded insert within the hole of the structure supporting arm.

13. The method of claim 12, wherein the bracket and the plunger component are components of the tool recited in claim 1.

14. The method of claim 12, wherein actuation of the plunger component involves rotation of the plunger component relative to the bracket.

15. The method of claim 12, wherein:

the distal end section of the plunger component comprises a pedestal having a distal end defining a bearing surface that contacts the exposed end of the threaded insert during use;

the distal end section of the plunger component comprises a guide tip extending from the distal end of the pedestal, the guide tip shaped and sized to fit within the internally threaded barrel of the threaded insert during use; and actuating the plunger component moves the guide tip into the internally threaded barrel.

16. The method of claim 15, wherein:

the threaded insert cooperates with an outer collar installed in the supporting wall structure, the outer collar having a collar hole defined therein;

the collar hole receives and mates with the internally threaded barrel of the threaded insert when installed in the supporting wall structure; and the pedestal of the plunger component is shaped and sized to fit within the collar hole during use.

17. The method of claim 16, wherein:

continuing actuation of the plunger component releases the threaded insert from the supporting wall structure and decouples the threaded insert from the outer collar.

18. The method of claim 17, further comprising the step of:

retracting the plunger component to withdraw the pedestal from the collar hole, such that the outer collar remains in place within the supporting wall structure.

19. The method of claim 12, further comprising the steps of:

removing the threaded insert after release from the supporting wall structure; and retracting the plunger component to facilitate removal of the bracket from the supporting wall structure.

* * * * *